(12) United States Patent
Erickson et al.

(10) Patent No.: US 7,334,396 B2
(45) Date of Patent: *Feb. 26, 2008

(54) METHOD AND APPARATUS FOR A ROCKET ENGINE POWER CYCLE

(75) Inventors: Christopher M. Erickson, Thousand Oaks, CA (US); James R. Lobitz, Oak Park, CA (US); William Bissell, Westlake Village, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/625,440

(22) Filed: Jan. 22, 2007

(65) Prior Publication Data

US 2008/0000217 A1    Jan. 3, 2008

Related U.S. Application Data

(63) Continuation of application No. 10/098,955, filed on Mar. 15, 2002, now Pat. No. 7,216,477.

(51) Int. Cl.
*F02K 9/46* (2006.01)
*F02K 9/64* (2006.01)

(52) U.S. Cl. ............................. 60/259; 60/260; 60/266
(58) Field of Classification Search ................. 60/257, 60/259, 260, 266, 267
See application file for complete search history.

(56) References Cited

U.S. PATENT DOCUMENTS 6,052,987 A * 4/2000 Dressler ...................... 60/260
6,769,242 B1 * 8/2004 Balepin ....................... 60/257

* cited by examiner

*Primary Examiner*—L. J. Casaregola
(74) *Attorney, Agent, or Firm*—Carlson, Gaskey & Olds

(57) ABSTRACT

A system for providing an oxidizer and a fuel to a rocket engine is provided. The system includes a fuel supply system. The fuel supply system includes a fuel pump that pumps fuel to the rocket engine. The system includes a coolant supply system that supplies a coolant to the rocket engine, and a power plant that powers at least one of the fuel supply system and the coolant supply system. The power plant is powered by energy received from the coolant system.

20 Claims, 1 Drawing Sheet

METHOD AND APPARATUS FOR A ROCKET ENGINE POWER CYCLE

CROSS-REFERENCE TO RELATED APPLICATIONS

This application is a continuation of U.S. patent application Ser. No. 10/098,955 filed on Mar. 15, 2002 now U.S. Pat. No. 7,216,477. The disclosure of the above application is incorporated herein by reference.

FIELD OF THE INVENTION

The present invention relates to propulsion systems and, more particularly, to a rocket engine power cycle and cooling system.

BACKGROUND OF THE INVENTION

A rocket engine provides propulsion to a craft by combusting propellants, such as fuel and an oxidizer, at high pressure. The combustion of the fuel and the oxidizers provide a hot gas which is then expelled through a nozzle at high velocity providing the thrust. Generally, these systems include high pressure and high temperature components which, due to the high pressure and high temperature environments, may be highly complex, heavy, and expensive.

Generally, turbines provide power to pumps which pump fuel and the oxidizer to the main combustion chamber of a rocket engine. High pressure gases power the turbines, which in turn power the pumps to feed the propellants. In order to produce high pressure gases, combustion devices such as pre-burners are provided to initially heat or combust a portion of the propellants. Certain propellants which may cool the main combustion chamber transfer the high pressure and high temperature gases therefrom to power the turbo pumps. This, however, requires an additional supply of propellants to power the turbines and cool the combustion chamber.

Regardless, it is generally known to power the turbines with high pressure and high temperature gases. As such, the turbines themselves must withstand high pressures and temperatures to perform properly in these environments. Additionally, several seals must be used to ensure that the oxidizers and fuels do not mix before entering the main combustion chamber. As such a pre-mixture may produce a system failure. Generally, the seals are purged with an inert or tertiary purge gas which is consumed in the seal to ensure that the oxidizer and fuel do not mix.

SUMMARY OF THE INVENTION

A system for providing an oxidizer and a fuel to a rocket engine is provided. The system includes a fuel supply system. The fuel supply system includes a fuel pump that pumps fuel to the rocket engine. The system includes a coolant supply system that supplies a coolant to the rocket engine, and a power plant that powers at least one of the fuel supply system and the coolant supply system. The power plant is powered by energy received from the coolant system.

Further provided is a system for providing an oxidizer and a fuel to a rocket engine. The system includes an engine and a fuel supply system. The fuel supply system includes a fuel pump that pumps a fuel to the engine. The system also includes an oxidizer supply system adapted to pump an oxidizer to the engine and a coolant supply system adapted to pump a coolant to the engine. The system includes a power source that powers at least one of the fuel supply system, the oxidizer supply system and the coolant supply system. The power source is powered at least in part by a transfer of energy from the coolant to the power source.

The present disclosure provides a system for providing an oxidizer and a fuel to a rocket engine. The system includes an oxidizer supply system that supplies the oxidizer to the engine and a cooling system operable to transfer thermal energy from the rocket engine to the oxidizer supply system. The system also includes a power plant that powers at least one of the oxidizer supply system and the cooling system. The power plant is powered at least in part by energy received from the cooling system.

Further areas of applicability of the present teachings will become apparent from the detailed description provided hereinafter. It should be understood that the detailed description and specific examples, while indicating various aspects of the present teachings, are intended for purposes of illustration only and are not intended to limit the scope of the teachings.

BRIEF DESCRIPTION OF THE DRAWINGS

The present teachings will become more fully understood from the detailed description, the appended claims and the following drawings briefly described below.

DETAILED DESCRIPTION

Figure 1:
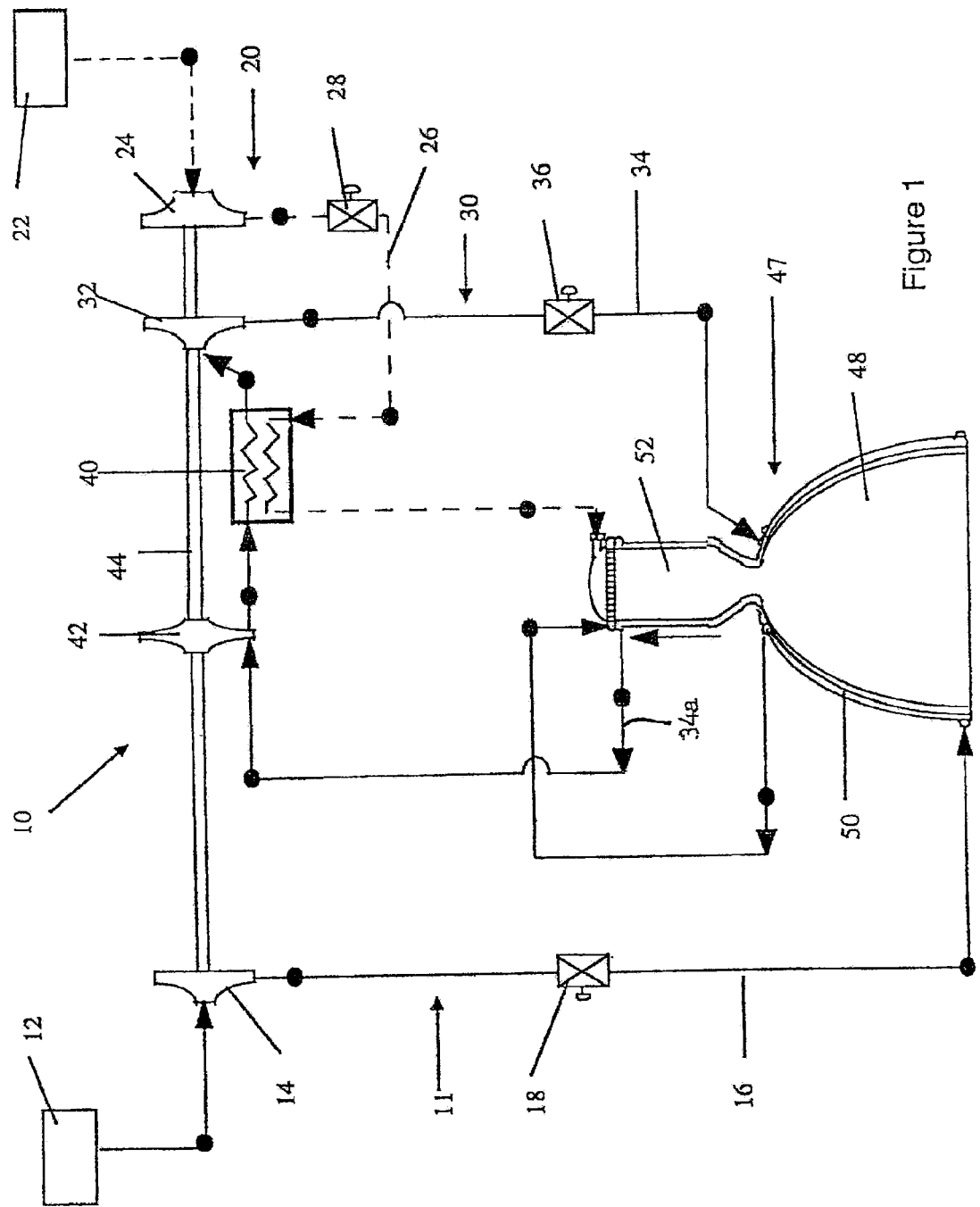
FIG. 1 is a diagrammatic view of an embodiment of the present disclosure.

The following description is merely exemplary in nature and is not intended to limit the present teachings, their application, or uses. It will be understood that although the following description relates to a rocket engine, any appropriate combustion system may employ the presently described disclosure.

With reference to FIG. 1, a diagram of an expander heat exchanger cycle system ("Ex-Hex" system) 10 according to one of various embodiments of the present disclosure is shown. The Ex-Hex system 10 is used to provide a low pressure and low temperature system to provide power propellants to a rocket engine. A fuel system 11 includes a fuel supply 12 which provides a fuel, one particular propellant, to the Ex-Hex system 10. The fuel provided from the fuel supply 12 may supply any fuel generally used in rocket engines, such as kerosene. The fuel supply system further comprises a fuel pump 14 and at least one fuel transport line 16 which include at least one valve 18. An oxidizer supply system 20 includes an oxidizer supply 22, forming a second propellant, which may comprise any appropriate oxidizer, such as oxygen. The oxidizer supply system 20 further comprises an oxidizer pump 24 which pumps the oxidizer through at least one oxidizer transport line 26, which includes a valve 28, into the Ex-Hex system 10. A coolant supply system 30 includes coolant pump 32 which pumps coolant through at least one coolant line 34, which include a valve 36. Both the oxidizer supply line 26 and the coolant supply line 34 communicate through a heat exchanger 40, described more fully herein. A turbine 42 is provided on a drive axle 44 which interconnects the turbine 42 with each of the pumps 14, 24 and 32. When the turbine 42 is powered, it rotates the drive axle 44 and drives each of the pumps 14, 24 and 32 simultaneously. Therefore, the single turbine 42 powers each of the pumps 14, 24 and 32. Nevertheless, it will be understood by one skilled in the art, that a single drive shaft 44 is not necessary and a plurality may be provided.

Each of the three compounds comprising the fuel, the coolant, and the oxidizer at some point engage an engine 47 which includes a nozzle 48. The nozzle 48 is surrounded by a cooling jacket 50 which includes channels where the different components may flow, as described further herein. Extending from the nozzle 48, and also a portion of the engine 47, is a combustion chamber 52 which generally defines a thrust chamber assembly. The combustion chamber 52 receives the fuel and the oxidizer to be combusted and then expels the combusted gases through the nozzle 48. When the gases are expelled through the nozzle 48 they provide the thrust to the system. The cooling jacket 50 may alternatively or additionally surround the combustion chamber 52 to provide cooling therefor as well.

During operation of the Ex-Hex system 10, the fuel leaves the fuel pump 14 and enters the fuel line 16 at a pressure generally between about 3000 and 4000 absolute pounds per square inch (psia), wherein the pressure per square inch is measured relative to a complete vacuum, and a temperature between about 520 degrees Rankin (° R) and about 600 degrees Rankin (° R) (about 60° F. and about 140° F. or about 15° C. and about 60° C.). The fuel then travels through the fuel line 16 to the nozzle 48 and travels through the cooling jacket 50 cooling the nozzle 48 as it travels through the cooling jacket 50. After exiting the cooling jacket 50, the fuel has dropped in pressure to generally between about 2500 and the 3500 psia and increased in temperature to between about 600° R and about 760° R (about 141° F. and about 301° F. or about 60° C. and about 149° C.) before it enters the main combustion chamber 52. This decrease in pressure and increase in temperature indicates a cooling of the nozzle 48, which helps to reduce the stress on the nozzle 48 during combustion.

The heat exchanger 40 transfers heat and energy from the coolant lines 34 to the oxidizer lines 26, as described further herein. The energy transferred from the coolant lines 34 is gathered at the combustion chamber 52. This facilitates cooling of the combustion chamber 52 and increases the temperature of the oxidizer. This generally begins when the coolant exits the coolant pump 32 at a pressure of between about 3500 and 4500 psia and at a temperature of between about 120° R to about 270° R (about −339° F. and about −189° F., or about −206° C. and about −123° C.), wherein the coolant is viewed as a cooled coolant. The coolant, after initially exiting the coolant pump 32, enters the cooling jacket 50 of the engine 47. The coolant increases in temperature, indicating an increased thermal energy, and a decreased pressure. The coolant evaporates into a gas, and/or increases temperature then exits the combustion area near the combustion chamber 52 and re-enters the coolant lines 34.

As the coolant exits the combustion chamber 52, it has a pressure of approximately between 2500 and 3200 psia while having a temperature of between about 800 and 1000 degrees R (about 341° F. and about 541° F., or about 171° C. and about 282° C.) and is now a hot coolant. The hot coolant continues along the coolant line 34 and enters the turbine 42, to power the turbine 42, which in turn powers each pump 14, 24, and 32. After depleting some energy, the hot coolant exits the turbine 42 at a pressure between about 280 and about 390 psia and a temperature of between about 500° R and about 700° R (about 41° F. and about 241° F., or about 4° C. and about 115° C.).

The hot coolant then enters the heat exchanger 40 to transfer a further portion of energy to the heat exchanger 40. After exiting the heat exchanger 40, the coolant has a pressure between about 180 and 280 psia and a temperature between about 150° R and about 250° R (about −309° F. and about −209° F., or about −189° C. and about −134° C.). The coolant has now returned to a cooled state again. The coolant is then pumped back into the coolant line 34 to re-circulate. In this way, the coolant is essentially never depleted in the Ex-Hex system 10.

The coolant continually cools the engine 47 and then is cooled and condensed while transferring most of its accumulated heat energy to the turbine 42 and the heat exchanger 40. These transfers of energy from the hot coolant condense or re-cools the coolant.

The oxidizer pump 24 pumps oxidizer at an initial pressure of between about 2500 and 3500 psia and an initial temperature between about 115° R and about 215° R (about −34° F. and about −244° F., or about −209° C. and about −153° C.) so that the oxidizer may be viewed as a cool oxidizer. The oxidizer is initially pumped through the heat exchanger 40 to receive some of the heat energy released by the hot coolant. That is, the heat exchanger 40 transfers energy between the hot coolant and the cool oxidizer. After exiting the heat exchanger 40, the oxidizer has become a hot oxidizer with a pressure of between about 2500 and 3200 psia and a temperature between about 220° R and about 300° R (about −239° and about −159° F., or about −150° C. and about −106° C.). The hot oxidizer then feeds into the combustion chamber 52 to oxidize the fuel.

The heat exchanger 40 increases the temperature of the oxidizer which enhances combustion efficiency in the combustion chamber 52. The coolant in the Ex-Hex system 10, which first gains heat and energy by cooling the engine 47, then transfers that heat and energy first to the turbine 42 to power the pumps 14, 24, and 32, and then transfers additional energy to the oxidizer through the heat exchanger 40. That is, the coolant in the Ex-Hex system 10 heats the oxidizer.

Placing the coolant pump 32 and the turbine 42, both containing coolant between the fuel pump 14 and the oxidizer pump 24 ensures that the fuel and the oxidizer do not mix before entering the combustion chamber 52. Because the coolant provides the energy to the oxidizer through the heat exchanger 40, the oxidizer and the fuel do not mix before entering the combustion chamber 52. Reducing the number of times the oxidizer and the fuel mix before entering the combustion chamber 52 increases the longevity and simplicity of the Ex-Hex system 10.

It will be understood that any appropriate heat exchanging system may be used as the heat exchanger 40 in the Ex-Hex system 10. Because the oxidizer is heated with the heat exchanger 40, the Ex-Hex system 10 need only provide fuel to the combustion chamber 52. Also, since the oxidizer does not enter the heat exchanger 40 at a high pressure or temperature, the heat exchanger 40 may be of a relatively uncomplicated design that need not resist extremely high pressures and temperatures. Also, since fuel does not enter the heat exchanger 40, the heat exchanger 40 need not be reinforced because no combustion should occur within the heat exchanger.

It will be appreciated that the coolant is the only compound which enters the Ex-Hex system 10 at a particularly high pressure. The coolant may be any appropriate inert compound or fluid. Exemplary coolants include inert fluids.

Because nitrogen, or any other inert coolant, is a relatively inert material, the coolant pump 32 need not be a complex system which ensures that a more corrosive or explosive material does not escape. Therefore, having an inert material as the high pressure material in the Ex-Hex system 10 reduces the complexity and cost of the pumps.

It will also be understood that the Ex-Hex system 10 may use any coolant to cool the engine 47 or any portion thereof, such as the nozzle 48 alone, along with a heat exchanger 40 to transfer that energy to the other compounds communicated to the combustion chamber 52. Moreover, the Ex-Hex system 10 may be implemented on any rocket engine which requires that the components be heated to a specific temperature to combust properly. Therefore, with only simple augmentation, the present disclosure may be applied to numerous rocket engine designs which require heated fuels and/or oxidizers to power the combustion chambers thereof. It will also be understood that any system to combust a fuel may use or be adapted to use the Ex-Hex system 10.

The description of the teachings herein is merely exemplary in nature and, thus, variations that do not depart from the gist of the teachings are intended to be within the scope of the teachings. Such variations are not to be regarded as a departure from the spirit and scope of the teachings.

What is claimed is:

1. A system in communication with a rocket engine comprising:
   a fuel supply system communicates fuel to the rocket engine;
   a coolant supply system that supplies a coolant to the rocket engine; and
   a power source that powers at least one of the fuel supply system and the coolant supply system the power source powered at least in part by energy received from the coolant supply system.

2. The system of claim 1, further comprising:
   an oxidizer supply system that supplies the oxidizer to the engine.

3. The system of claim 2, wherein the oxidizer supply system is powered at least in part by the power source.

4. The system of claim 2, wherein the coolant system transfers thermal energy from the rocket engine to the oxidizer supply system.

5. The system of claim 2, wherein the oxidizer supply system further comprises:
   at least one oxidizer transport line to transport the oxidizer from the oxidizer supply system to the engine; and
   a pump that pumps the oxidizer through the at least one oxidizer transport line.

6. The system of claim 5, wherein the coolant supply system comprises:
   a coolant pump;
   a heat exchanger; and
   at least one coolant transport line, wherein the coolant is pumped through the coolant transport line to the rocket engine to transfer heat from the engine to the heat exchanger and the oxidizer is pumped through the oxidizer transport line and through the heat exchanger to gain energy before entering the engine.

7. The system of claim 6, wherein the coolant pump of the coolant supply system forms a barrier by being located within the system between the fuel supply system and the oxidizer supply system to inhibit mixing of the fuel and the oxidizer before the fuel and the oxidizer enter the combustion chamber.

8. The system of claim 1, wherein the coolant comprises nitrogen.

9. A rocket engine, comprising:
   a thrust chamber assembly;
   a fuel supply system that communicates fuel to the thrust chamber assembly;
   an oxidizer supply system that communicates oxidizer to the thrust chamber assembly;
   a coolant supply system that communicates coolant to the thrust chamber assembly;
   a power source that powers at least one of the fuel supply system, the oxidizer supply system, the coolant supply system, or combinations thereof the power source powered at least in part by a transfer of energy from the coolant to the power source.

10. The rocket engine of claim 9, wherein the coolant supply system transports the coolant adjacent to a portion of the thrust chamber assembly such that the coolant is in thermal contact with the portion of the thrust chamber assembly and thus receives energy from the thrust chamber assembly.

11. The rocket engine of claim 10, further comprising:
    a heat transfer system operable to transfer energy from the coolant to the oxidizer before the oxidizer enters a combustion chamber of the thrust chamber assembly.

12. The rocket engine of claim 9, wherein the coolant supply system comprises:
    a coolant pump;
    a heat exchanger; and
    at least one coolant transport line, wherein the coolant is pumped through the coolant transport line that is in thermal contact with the thrust chamber assembly to transfer heat from the thrust chamber assembly to the heat exchanger.

13. The rocket engine of claim 12, wherein the oxidizer supply system comprises:
    an oxidizer pump;
    at least one oxidizer transport line wherein the oxidizer is pumped through the oxidizer transport line and through the heat exchanger to gain energy before entering the thrust chamber assembly.

14. The rocket engine of claim 12, wherein the coolant pump of the coolant supply system forms a barrier by being located within the system between the fuel supply system and the oxidizer supply system to inhibit mixing of the fuel and the oxidizer before the fuel and the oxidizer enter the combustion chamber.

15. A system for providing an oxidizer and a fuel to a rocket engine, comprising:
    an oxidizer supply system that supplies the oxidizer to the rocket engine;
    a coolant system operable to transfer thermal energy from the rocket engine to the oxidizer supply system;
    a power source that powers at least one of the oxidizer supply system and the cooling system; and
    an energy transfer system operable to transfer energy from a coolant in the coolant system to, at least in part, power the power source.

16. The system of claim 15, further comprising a fuel supply system that provides the fuel to the rocket engine.

17. The system of claim 16, wherein the power source powers the fuel supply system, the oxidizer supply system, and the coolant system.

18. The system of claim 17, further comprising:
    a heat exchanger;
    wherein the coolant system comprises a first pump and a coolant transport line passing through the heat exchanger to move the coolant;

wherein the oxidizer supply system comprises a second pump and an oxidizer transport line passing through the heat exchanger to move the oxidizer;

wherein the coolant moved in the coolant transport lines absorbs thermal energy from the rocket engine as the coolant is pumped in thermal contact with a portion of the rocket engine; and wherein the coolant transfers a first portion of the thermal energy absorbed to the power source and the coolant transfers a second portion of the thermal energy through the heat exchanger to the oxidizer transport line.

19. The system of claim 16, wherein the cooling system moves an inert compound, and the cooling system includes a pump that is located between the fuel supply system and the oxidizer supply system to prevent mixing of the fuel and the oxidizer before the fuel and the oxidizer enter the rocket engine.

20. The system of claim 15, further comprising:
a heat exchanger; and
wherein the coolant system transfers energy to the oxidizer supply through the heat exchanger.

* * * * *